Oct. 27, 1931.    G. K. LEWIS    1,829,527
VEHICLE BODY CONSTRUCTION
Filed April 16, 1928    2 Sheets-Sheet 1
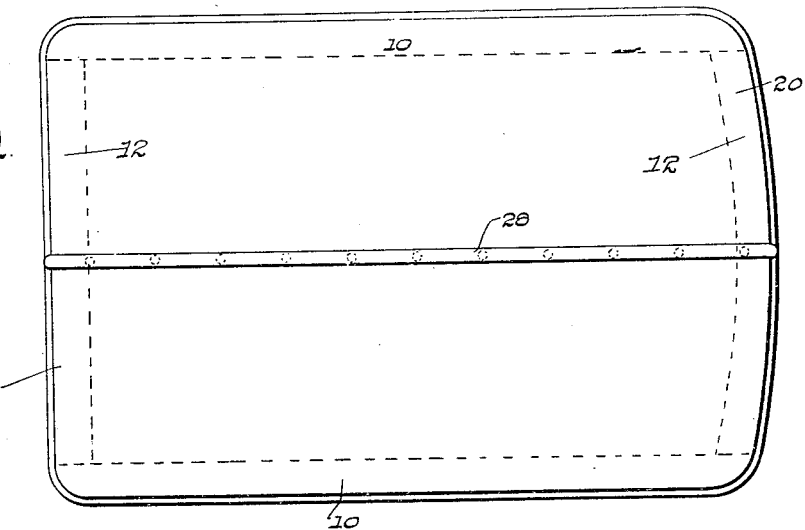
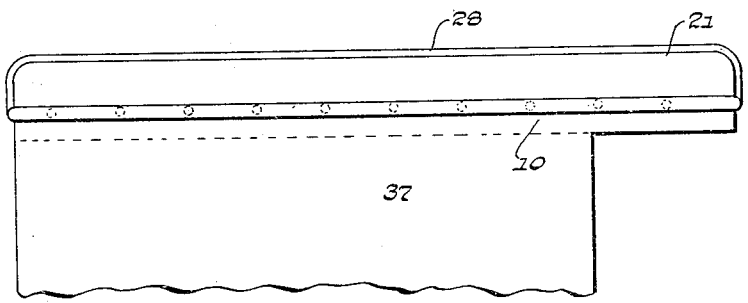
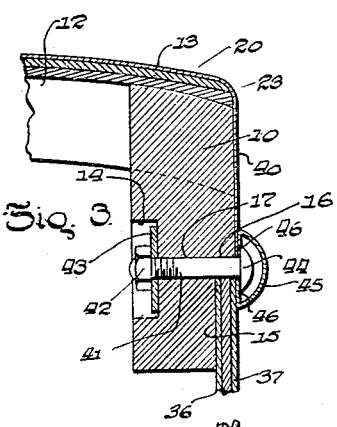
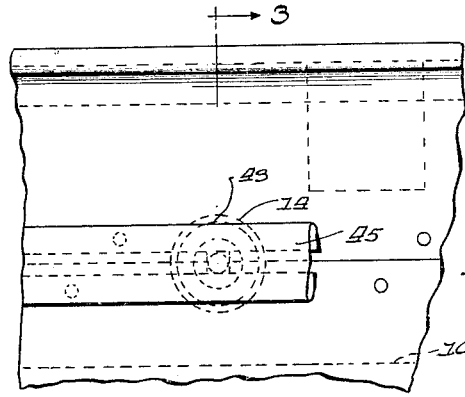
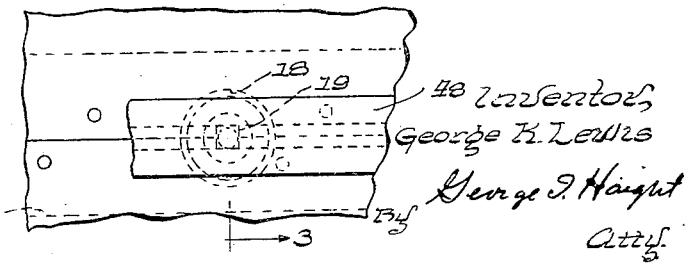

Oct. 27, 1931.    G. K. LEWIS    1,829,527
VEHICLE BODY CONSTRUCTION
Filed April 16, 1928    2 Sheets-Sheet 2
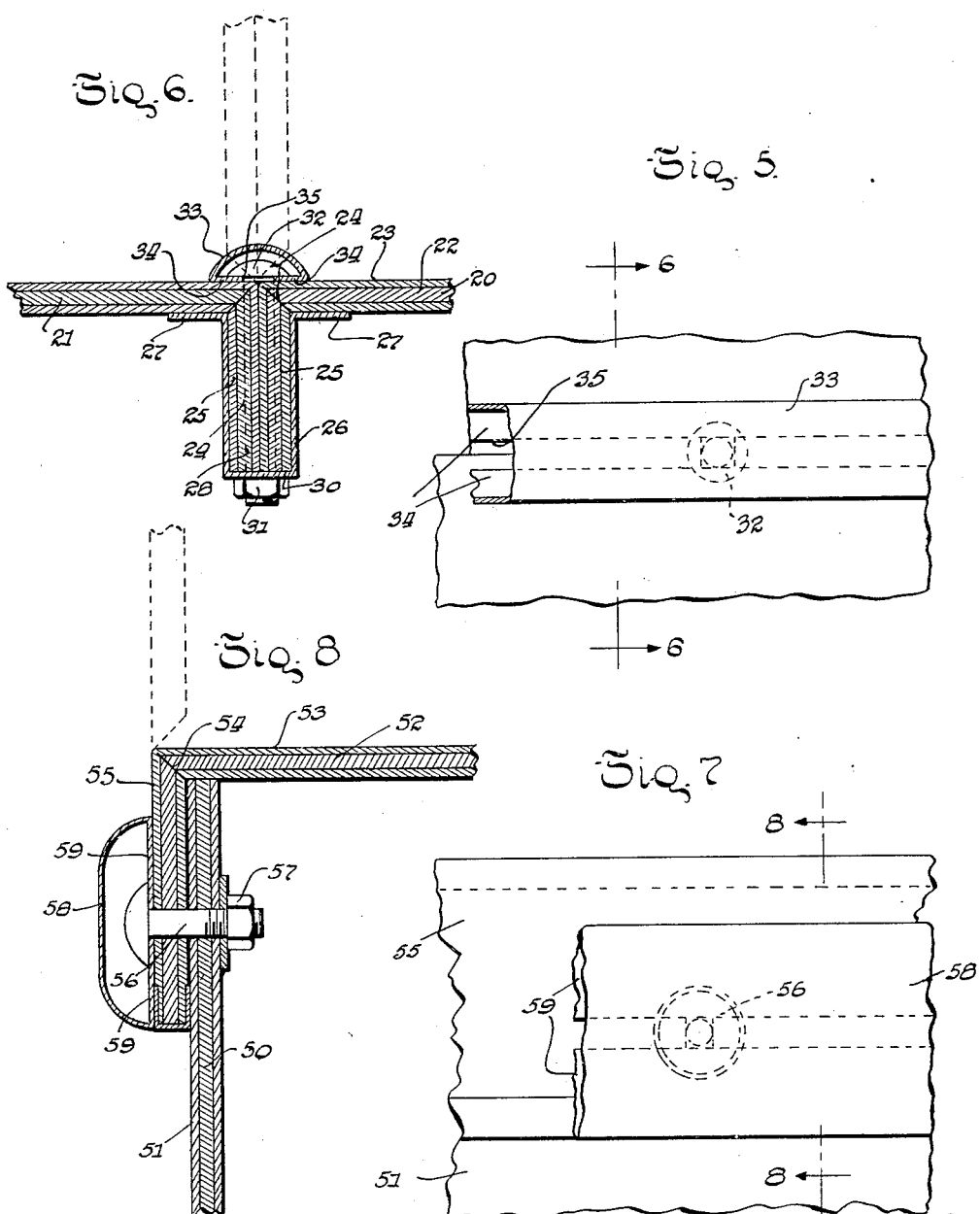
Witness
William P. Kilroy
Inventor,
George K. Lewis
By George I. Haight,
Atty.

Patented Oct. 27, 1931

1,829,527

UNITED STATES PATENT OFFICE

GEORGE K. LEWIS, OF CHICAGO, ILLINOIS, ASSIGNOR TO MET-L-WOOD CORPORATION, OF CHICAGO, ILLINOIS, A CORPORATION OF ILLINOIS

VEHICLE BODY CONSTRUCTION

Application filed April 16, 1928. Serial No. 270,221.

This invention relates to vehicle body constructions.

An object of the invention is to provide a vehicle body construction composed of laminated panels, each including a fibrous body and exterior sheet steel veneer, and wherein a plurality of said panels are fabricated in a novel manner to provide the maximum of strength and attractiveness in appearance.

A more particular object of the invention is to provide a vehicle body of the character referred to, wherein the meeting edges of the panels which are utilized to form the body, are secured together by the employment of fabricating means, including securing elements and a cover strip or molding, and wherein the molding serves to conceal the securing elements and is itself held in position to reinforce the structure by the securing elements.

Other and further objects of the invention will more clearly appear from the description and claims hereinafter following.

Referring to the drawings forming a part of this specification, Figure 1 is a top plan view of a vehicle body embodying my invention. Figure 2 is a side elevational view of a vehicle body embodying the invention, a part of the body being broken away. Figure 3 is a transverse, vertical, sectional view of the vehicle body corresponding substantially to the line 3—3 of Figure 4. Figure 4 is a broken side elevational view of one side portion of the vehicle body. Figure 5 is a fragmentary top plan view of the top wall or roof portion of the vehicle body. Figure 6 is a transverse, vertical, sectional view of the roof of the vehicle body corresponding substantially to the line 6—6 of Figure 5 and showing the manner of fabricating separate portions of the roof structure. Figure 7 is a side elevational view of a fragment of a vehicle body showing a modified form of means which are utilized for fabricating the side and top walls of the vehicle. Figure 8 is a transverse, vertical, sectional view corresponding substantially to line 8—8 of Figure 7 and showing in dotted lines the position of the roof panel before it is moved at an angle with reference to the side portion thereof.

Referring first to Figures 1 to 6 of the drawings, the vehicle body is shown as including upper longitudinally extending frame members 10—10 and lower longitudinally extending frame members 11—11 as shown in detail in Figure 3. The upper frame members 10 are connected at their ends by cross pieces 12—12, which are somewhat curved, as shown in Figure 3, to impart a curved contour to the roof of the vehicle body transversely thereof. Each of the side frame members 10 is rounded off at the top as indicated at 13, and at its inner side is provided with a row of separate sockets indicated at 14, the row of sockets extending along the frame member 10 on the inner side thereof substantially from one end to the other. The outer surface of each frame member 10 is provided with a rabbeted portion 15 which extends longitudinally of the frame member 10, the upper defining wall of which is indicated at 16. Transversely extending bores 17 extend centrally from each socket 14 outwardly through the frame member 10 and terminate in the rabbeted portion 15, the upper defining wall of each bore ending flush with the wall of the rabbeted portion 15. Each lower frame member 11 is also provided with a row of separate sockets, indicated at 18, which communicate with bores 19 extending transversely through the frame member 11.

The roofing or top wall of the vehicle body is made up of a pair of panels designated by the numerals 20—21, each of the panels extending longitudinally with reference to the body, and being secured together centrally by fabricating means of a novel character. Each of the panels 20 and 21 is made up of laminated ply wood and steel, the ply wood indicated at 22, providing the main body portion for the panel, while the outer surface thereof has a sheet steel veneer 23 rigidly affixed thereto, preferably by employment of the process disclosed in Burnett reissue Patent No. 14,349, dated September 11, 1917. Adjacent the inner edge of the panel 20, the main body portion 22 of ply wood is cut out as indicated at 24, permitting a marginal portion of the panel to be disposed substantially at right angles to the remainder thereof, the angular portion being designated by the reference character 25, it being understood that the steel sheet 23 may be bent substantially into right angular form and the body portion permitted to assume the desired position through provision of the cut-out portion 24. The panel 21 is arranged in the same manner as the panel 20 and the same reference characters will be utilized to designate similar parts of the two panels, it being noted that the angular portions 25 of the panels 20 and 21 are disposed in abutting relation. In order to secure the angular portions 25—25 of the panels in the desired position, an inverted channel-shaped re-inforcing element 26 is utilized, which is adapted to receive the two angular portions 25—25 of the panels therein, the legs of the panel formation being provided with flanges 27—27 which abut the undersurfaces of the main body portions of the panels 20 and 21, as best shown in Figure 6. The structure comprising the angular portions 25—25 and the panel reinforcing member 26, are provided with bores at intervals along the length of the construction, as indicated at 28, each bore being adapted for the reception of a retaining bolt 29, the shank of which extends through the web 30 of the channel member and has its end threaded for the reception of a securing nut 31. The opposite end of the shank 29 is provided with a head 32 adapted to bear against a combined reinforcing cover strip or molding which will now be described.

The cover strip or molding, indicated as a whole at 33, is of elongated formation, and curved into arcuate form in cross-section, and is provided with inwardly extending flanges 34—34, which define a longitudinally extending slot 35 throughout the length of the molding or cover strip. Prior to tightening up the nuts upon the bolts 29, the flanges 34—34 of the molding 33 are successively inserted beneath the heads of the row of bolts and the molding strip moved longitudinally with reference to the bolts as permitted by the slot 35 therein. When the molding strip is in position, the nuts 31 of the bolts 29 are tightened, thereby securing the molding strip in place, concealing the bolt heads 32, and serving to hold the molding strip in such maner as to provide a longitudinal reinforcing brace for the top of the vehicle body. If desired, some water-proofing compound may be let into the joint so as to more securely seal the same.

The side walls of the vehicle body are also composed of laminated panels made up of ply wood indicated at 36, with an outer veneer of sheet steel as indicated at 37, the panels being of the same character as those which form the top wall or roofing of the vehicle body. As best shown in Figure 3, the side panel has its upper edge fitting into the rabbetted portion 15, and said edge is provided with a plurality of arcuate notches 38 adapted to coincide in position with the bores 17 through each member 10. The lower portion of the side panel lies flat against the outer surface of the lower frame member 11 and the panel is provided with a row of apertures 39 which are adapted to register with the bores 19 in the member 11. The steel veneer 23 upon the panel 20 is extended from the edge thereof and bent at an angle so as to lie against the outer surface of the upper portion of the frame member 10, the extension being indicated by the reference character 40. The lower edge of the extension 40 lies flush with the top defining wall 16 of the rabbeted portion 15. Retaining bolts 41 are utilized for securing both the extension 40, and the upper edge of the side panel in position, said bolts extending through the bore 17 and having their inner ends projecting into the sockets 14. The inner ends of the bolts are threaded for the reception of securing nuts as indicated at 42, which lie within the related sockets 14, there preferably being a washer 43 interposed between the nut 42 and the bottom of the socket 14. The opposite ends of the bolts 41 are provided with heads 44 adapted to cooperate with the cover strip and strengthening member indicated at 45. The cover strip 45 is of a character similar to the strip 33 heretofore described, having inturned flanges 46—46 defining a slot through which the stems of the bolts may slide during the time the flanges 46—46 are being disposed beneath the heads 44 of the bolts 41, it being noted that the stems of the bolts fit in suitable notches of the upper edge of the side panel. Bolts 47 are provided which extend through the bores 19 in the frame member 11, in the same manner as the bolts 41, there being a reinforcing molding strip 48 of the same character as the strip 45, which conceals the heads of the bolts 47, in this instance, the stems of the bolts passing through the apertures 39 in the side panel. The construction at the opposite side of the vehicle body is the same as that just above described.

Referring to Figures 7 and 8, a somewhat different embodiment of the invention is disclosed. In this construction, the side wall comprises a plain panel 50, having a steel veneer 51 thereon. The top panel 52 is provided with a steel veneer 53, the body portion of the panel being cut out as indicated at 54 to permit bending of the veneer to provide the angular portion 55 which fits over the outside of the top portion of the side wall 50, as best shown in Figure 8. A series of bolts indicated at 56 are extended through the abutting portions of the side panel and the angular portion 55 of the top panel, each bolt being provided with a securing nut 57. The heads of the bolts are disposed within a cover strip 58 provided with flanges 59—59 which fit beneath the heads of the bolts 56, and when the nuts 57 are tightened, the cover strip 58 conceals the heads of the bolts and provides a reinforcing element extending longitudinally of the body.

By the above described arrangement, it will be appreciated that a vehicle body is provided made up of laminated panels which are secured at their meeting edges by means of reinforcing structures, wherein the joints are braced and the molding strips which are utilized in such manner as to assist in bracing the joints, serve also to conceal the bolt heads, and provide a neat and attractive arrangement.

While I have herein shown and described what I now consider the preferred manner of carrying out my invention, the same is merely illustrative and I contemplate all changes and modifications that come within the scope of the claims appended hereto.

I claim:—

1. In a side wall structure for a vehicle body, comprising upper and lower frame members, the upper of said frame members being rabbeted; of a laminated panel having a marginal portion disposed within the rabbeted portion of said upper frame member and adapted to lie against the lower frame member; securing elements extending through said frame members and serving to clamp said panel thereto; exterior exposed reinforcing strips held in position by said securing members and serving to conceal portions thereof and to reinforce the structure, and a top wall having a metal sheathing overlapping said frame adjacent said rabbeted portion and secured by said securing means.

2. In a structure of the character described, the combination with a side wall and top wall of a vehicle body structure; of a frame member adapted to support said top and side wall, said top wall including a laminated panel having an exterior steel veneer overlapping said frame member, said frame member being provided with a rabbeted portion; a laminated side panel having a marginal portion disposed in said rabbeted portion with its exterior face substantially flush with said overlapping steel veneer; and securing elements extending through said frame member and having means for simultaneously clamping the veneer of the top panel and the side panel against said frame member.

3. In a structure of the character described, the combination with a side wall and top wall of a vehicle body structure; of a frame member adapted to support said top and side wall, said top wall including a laminated panel having a steel veneer overlapping said frame member, said frame member being provided with a rabbeted portion; a side panel having a marginal portion disposed in said rabbeted portion; securing elements having means for simultaneously securing the veneer of the top panel and the side panel to said frame member; and a reinforcing strip secured in position by said securing elements and adapted to bear upon the adjacent edges of said veneer and said side panel.

4. In a structure of the character described, the combination with a vehicle body; of a roof for said body composed of a plurality of panels disposed in the same plane and having edge portions turned at an angle and disposed with their faces in abutting relation; of a channel member fitting about said turned edge portions with its legs bearing against the inner side of said panels; securing elements freely extending through and parallel with said annular portions and said channel member; and a reinforcing element secured by said securing elements in position to bear upon said panels at the outer sides thereof, said securing element simultaneously and uniformly clamping said angular portions, said reinforcing elements and said channel member together.

5. In a structure of the character described, the combination with two members disposed in abutting relation; of a plurality of fastening bolts extending freely through said members and having heads bearing upon the outer surfaces of said members, said bolts being freely adjustable to permit the same to be drawn tightly together; and a molding strip having a continuously closed hollow body portion enclosing the clamping elements at one side of said members, said molding being provided with flat extensions interposed between the heads of the adjacent clamping bolts and adjacent surface of said members, whereby said molding strip and said members are clamped with a uniform pressure when said clamping elements are arranged in clamping position.

In witness that I claim the foregoing I have hereunto subscribed my name this 31st day of March, 1928.

GEORGE K. LEWIS.